United States Patent
Brown et al.

(10) Patent No.: US 11,624,295 B2
(45) Date of Patent: Apr. 11, 2023

(54) GAS TURBINE ENGINE

(71) Applicants: ROLLS-ROYCE plc, London (GB); ROLLS-ROYCE DEUTSCHLAND LTD & CO KG, Dahlewitz (DE)

(72) Inventors: David Brown, Derby (GB); Jorge Calderon, Berlin (DE)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 369 days.

(21) Appl. No.: 16/692,259

(22) Filed: Nov. 22, 2019

(65) Prior Publication Data

US 2020/0200037 A1 Jun. 25, 2020

(30) Foreign Application Priority Data

Dec. 20, 2018 (GB) .................................. 1820823.1

(51) Int. Cl.
 *F01D 21/00* (2006.01)

(52) U.S. Cl.
 CPC ......... *F01D 21/006* (2013.01); *F01D 21/003* (2013.01); *F05D 2260/902* (2013.01)

(58) Field of Classification Search
 CPC ...... F01D 21/003; F01D 21/006; F01D 17/02; F01D 21/045; F05D 2260/902; Y02T 50/60
 See application file for complete search history.

(56) References Cited

U.S. PATENT DOCUMENTS

| | | | |
|---|---|---|---|
| 3,901,557 A * | 8/1975 | Daniels | F01D 25/164 |
| | | | 384/627 |
| 4,498,291 A | 2/1985 | Jeffery | |
| 4,503,667 A | 3/1985 | Roberts | |

(Continued)

FOREIGN PATENT DOCUMENTS

| | | |
|---|---|---|
| CA | 2929832 A1 | 12/2016 |
| EP | 1995414 A1 | 11/2008 |

(Continued)

OTHER PUBLICATIONS

Jun. 20, 2019 Search Report issued in British Patent Application No. 1820823.1.

(Continued)

*Primary Examiner* — Audrey B. Walter
*Assistant Examiner* — Dapinder Singh
(74) *Attorney, Agent, or Firm* — Oliff PLC (57) ABSTRACT

A gas turbine engine, and an aircraft including the gas turbine engine. The gas turbine engine comprising: an engine core comprising a turbine, a compressor, and a shaft system connecting the turbine to the compressor. The shaft system is axially located by a thrust bearing located forward of the turbine, and the engine is configured such that, in the event of a shaft break which divides the shaft system into a front portion located by the thrust bearing and a rear portion unlocated by the thrust bearing, the rear portion is free to move axially rearwardly under a gas load; and the engine further comprises an axial movement sensor configured to register a shaft break when it detects the axial movement of the rear portion of the shaft system.

11 Claims, 3 Drawing Sheets

(56) References Cited

U.S. PATENT DOCUMENTS

| | | | | |
|---|---|---|---|---|
| 6,312,215 | B1* | 11/2001 | Walker | F16D 51/40 |
| | | | | 415/9 |
| 2009/0123269 | A1* | 5/2009 | Bart | F01D 21/003 |
| | | | | 415/118 |
| 2013/0071230 | A1* | 3/2013 | Kulczyk | F01D 21/045 |
| | | | | 415/118 |
| 2015/0176431 | A1* | 6/2015 | Raykowski | F16C 35/067 |
| | | | | 415/9 |
| 2016/0363000 | A1* | 12/2016 | Oates | F01D 21/04 |
| 2018/0016937 | A1 | 1/2018 | Panzner et al. | |

FOREIGN PATENT DOCUMENTS

| | | |
|---|---|---|
| EP | 2570618 A2 | 3/2013 |
| EP | 3103969 A1 | 12/2016 |
| EP | 3128307 A1 | 2/2017 |
| GB | 1427339 A | 3/1976 |
| WO | 99/64727 A1 | 12/1999 |

OTHER PUBLICATIONS

Apr. 29, 2020 Search Report issued in European Patent Application No. 19210225.9.

* cited by examiner

GAS TURBINE ENGINE

CROSS-REFERENCE TO RELATED APPLICATIONS

This specification is based upon and claims the benefit of priority from UK Patent Application Number GB 1820823.1 filed on 20 Dec. 2018, the entire contents of which are incorporated herein by reference.

BACKGROUND

Field of the Disclosure

The disclosure relates to a gas turbine engine, and particularly a gas turbine engine for use in an aircraft.

Description of the Related Art

Modern gas turbine engines generally have up to three compressor-turbine groups, also referred to as spools, connected by respective concentric shafts. These compressor-turbine groups are responsible for the compression and expansion of air passing through the engine.

For example, the Rolls-Royce Trent 1000 aerospace gas turbine engine has three compressor-turbine groups: the low pressure compressor-turbine group, the intermediate pressure compressor-turbine group, and the high pressure compressor-turbine group. Each of these has a corresponding compressor and turbine. In the case of the low pressure compressor-turbine group, the low pressure compressor is generally referred to as the fan.

It is possible, during operation of the gas turbine engine, for a shaft connecting a compressor and turbine pair to mechanically fail. The breakage in the shaft leads to an instantaneous decoupling between the turbine and its respective compressor. As a result the compressor may decelerate rapidly, as it is no longer driven by the turbine, and the turbine may accelerate rapidly, as it is no longer driving the compressor.

The rapid acceleration of the turbine is particularly concerning, as over-speed events can lead to disintegration of the turbine, including possibly bursting of the turbine disc, and further damage to the gas turbine engine.

Also of concern on shaft break, however, is loss of axial retention of decoupled parts of a spool.

It is important then to rapidly recognise a shaft break within a gas turbine engine, so that the appropriate action can be taken. Previous shaft failure detection systems can have detection time periods in the range of 20-30 ms. During this period, the turbine can accelerate in an unmanaged manner towards its terminal speed i.e. the maximum speed reached prior to the turbine decelerating.

SUMMARY

Accordingly, in a first aspect, there is provided a gas turbine engine, comprising: an engine core comprising a turbine, a compressor, and a shaft system connecting the turbine to the compressor; wherein the shaft system is axially located by a thrust bearing located forward of the turbine, and the engine is configured such that, in the event of a shaft break which divides the shaft system into a front portion located by the thrust bearing and a rear portion unlocated by the thrust bearing, the rear portion is free to move axially rearwardly under a gas load; and wherein the engine further comprises an axial movement sensor configured to register a shaft break when it detects the axial movement of the rear portion of the shaft.

Advantageously, by ensuring that an unlocated rear portion is free to axially move in the event of a shaft break, the detection time for the shaft break can be reduced. For example, the detection time can be reduced to less than 10 ms.

In a second aspect, there is provided an aircraft including the gas turbine according to the first aspect.

The gas turbine engine may have any one, or any combination, of the following optional features.

The shaft system may be supported by one or more non-thrust bearings (e.g. roller bearings) rearwards of the thrust bearing.

Typically the thrust bearing is a ball bearing.

The thrust bearing may be positioned adjacent the compressor. Advantageously, this can ensure that the majority, if not all, of a torque path of the shaft system is axially unlocated in the event of a shaft break. Related to this, the shaft system forward of the thrust bearing can be configured to have an ER (i.e. "Extremely Remote") probability of failure, ER being taken as a probability of failure in the range of $10^{-7}$ to $10^{-9}$ per Engine Flight Hour. In this way, shaft break failure resulting in a located rear portion (and hence no registration of shaft break by the axial movement sensor) can be effectively excluded.

The turbine may be a low pressure turbine, and the compressor may be a low pressure compressor. The low pressure compressor may be a fan. In this case, the shaft system may comprise a main shaft component which extends forward from the turbine, and a fan shaft component which joins to a front end of the main shaft component and connects the fan to the shaft, the thrust bearing axially locating the shaft system at the fan shaft component.

However, in the present disclosure, by the "shaft system" we mean more generally those elements forming the torque path between the turbine and the compressor. Thus, the shaft system in the present disclosure typically comprises one or more components which, using conventional terminology, would be known as "shafts", but as well as these components, the shaft system of the present disclosure may further comprise a drive arm of the turbine, e.g. an arm extending between the above-mentioned main shaft component and the turbine. Such a drive arm also forms part of the torque path between the turbine and the compressor. In the case of a multi-stage turbine, the drive arm may include any interstage drive arm(s) of the multi-stage turbine.

The gas turbine engine may further comprise a friction decelerator which, in the event of a shaft break, engages with the turbine to apply frictional breaking thereto. This can help to reduce the terminal speed of the turbine. Advantageously, the friction decelerator may be located aft of the turbine, so that in the event of a shaft break the turbine is pushed into the friction decelerator by the axial movement of the rear portion of the shaft.

Additionally or alternatively, the gas turbine engine may be configured so that the axial movement of the rear portion of the shaft produces tangling of rotors and stators of the turbine. This can also help to reduce the terminal speed of the turbine.

The axial movement sensor may be a distance sensor, and may be configured to measure a distance between the rear portion of the shaft system and a static structure of the gas turbine engine. The axial movement sensor may be a backing sensor, configured to detect axial movement of the rear portion of the shaft. Advantageously, by locating the axial movement sensor towards the rear portion of the shaft, it is easier to replace the sensor in the event of sensor failure (as it is not embedded deep within the engine core).

The gas turbine engine may further comprise an electronic engine controller, which may be configured to restrict a flow of fuel to the gas turbine engine when the axial movement sensor registered a shaft break.

The axial movement sensor may register the shaft break as a binary signal. Advantageously, this can decrease the risk of a false positive detection.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Examples of the disclosure will now be described by way of example with reference to the accompanying drawings in which.

DETAILED DESCRIPTION OF THE DISCLOSURE

Figure 1:
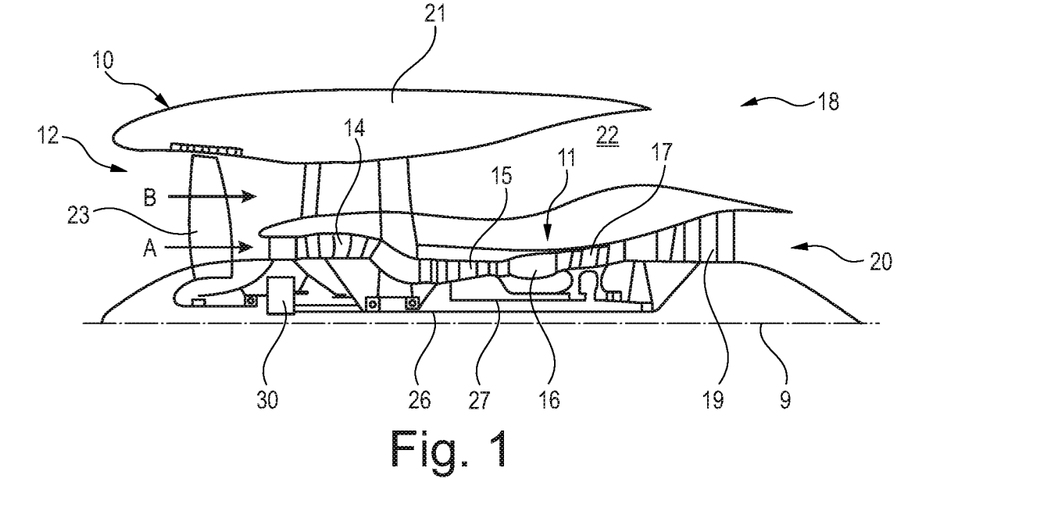
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
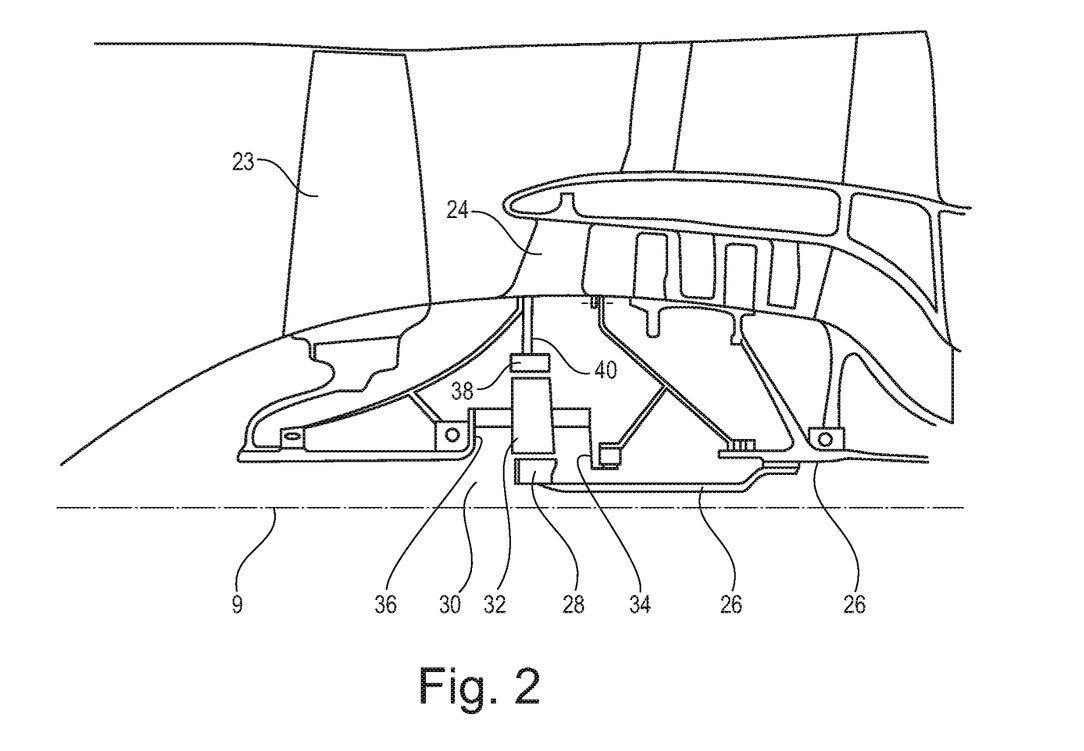
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
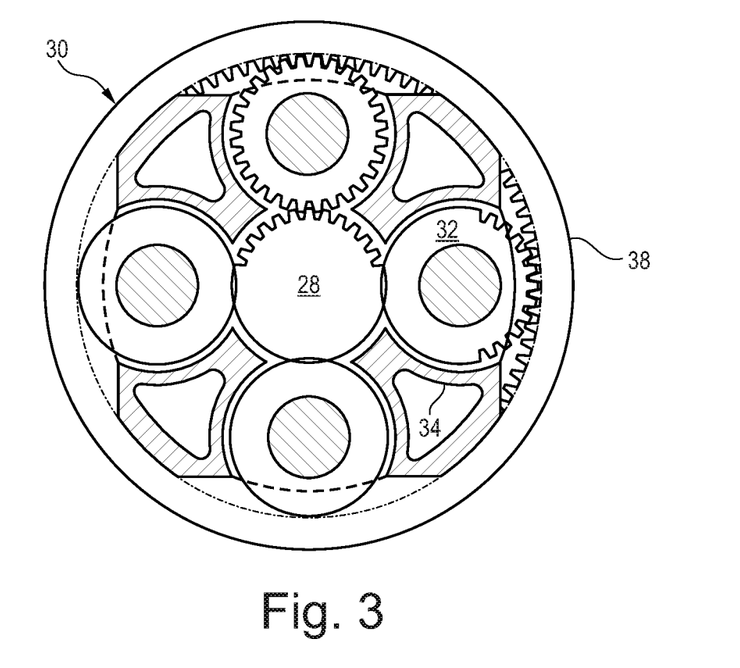
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
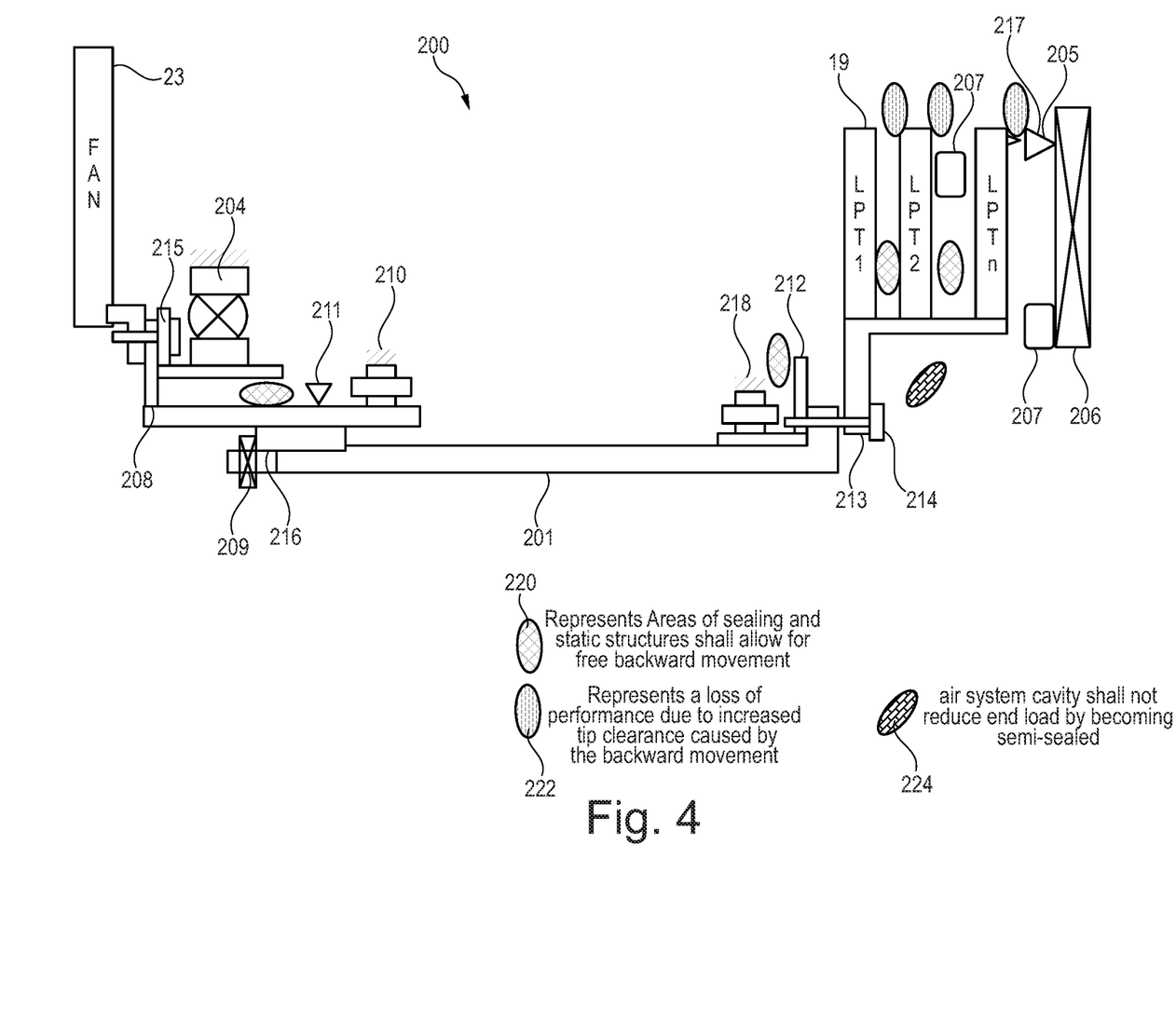
FIG. 4 is a schematic longitudinal cross-sectional view of a low pressure spool.

FIG. 4 is a schematic longitudinal cross-sectional view of an LP spool 200 of another gas turbine engine to which the present disclosure applies, the spool comprising a fan 23, an LP turbine 19 and their interconnecting shaft system. In this case, the engine has a configuration in which the fan 23 is driven at the same rotational speed as the LP turbine 19, i.e. without the intermediary of a gearbox 30. The LP turbine in this example has several stages, the rotors of which are designated LPT1, LPT2 . . . LPTn.

The shaft system of the LP spool 200 comprises a main shaft component 201 and a fan shaft component 208. The main shaft component extends forward from the LP turbine 19 to join to the fan shaft component via an oversized spline 216 or self-winding locking nut 209. Thus functionally the main and fan shaft components form a single shaft. The use of an oversized spline can allow the spline connection to achieve a probability of failure which is ER. A self-winding locking nut may be used in the case of an axial backward load on the spool. Therefore, if the shaft system fails, the backward axial force will unwind the nut and release the shaft system rearwards.

The shaft system further comprises an LP turbine drive arm 213 which connects to the main shaft component 201 via an LP turbine stubshaft 212 and bolt arrangement 214. A speed detector 211 measures the rotational speed of the LP spool. In the example shown, the speed detector 211 is positioned adjacent to the fan shaft component 208 and measures the rotational speed of that component In another example, not shown, the speed detector is adjacent to a thrust bearing 204 on a fan stubshaft 215 and measures the rotational speed of the fan stubshaft. In this way, in the event of a shaft failure (and hence an unlocated failure) there will be a reliable speed measurement of the fan as the speed detector is based on a phonic wheel and a reluctance probe which require axial alignment of these components to function. A non-located failure will result in the axial alignment being lost. Moreover, the separation of the fan shaft component 208 and fan stubshaft means that, in the event of a failure in the fan shaft, the fan stubshaft should be isolated from this failure.

The LP shaft system is supported by three bearings: the thrust bearing 204, in this example a ball bearing, which also axially locates the shaft system; a first roller bearing 210; and a second roller bearing 218. The fan stubshaft 215, also functioning as a fan catcher, is fastened to the front end of the fan shaft component 208 and provides a mounting position for the thrust bearing 204 adjacent to and behind the fan 23. The fan stubshaft is designed to a probability of failure of ER. The first roller bearing is mounted to the rear of the fan shaft component. The second roller bearing 218 is mounted to the main shaft component 201 adjacent to the low pressure turbine drive arm 213. Positioning the thrust bearing 204 on the fan stubshaft 215 means that in the event of a shaft failure (notably in the fan shaft component) the fan 23 will still be retained by the fan stubshaft.

As a result of the spool 200 being axially located by just the thrust bearing 204 at a position adjacent the fan 23, in the event of a shaft break, the shaft system divides into a front portion located by the thrust bearing and an unlocated rear portion which moves axially rearwardly under the gas load of the engine. An axial movement sensor 205, fitted to a static structure 206 of the gas turbine engine (e.g. a stator or casing of the engine core) is configured to register a shaft break when it detects this axial movement. In this example, the axial movement sensor 205 detects the axial movement of the final rotor stage LPTn of the LP turbine 19. By positioning the axial movement sensor on the final rotor stage of the turbine, a failure of the turbine drive arm 213 or interstage drive arm thereof can also be detected.

In general, the arrangement of the spool 200 is such that, in the event of shaft break, the failure or break is not axially located. For example should a failure occur in the shaft system, the resulting unlocated rear portion of the shaft system can move axially. The turbine drive arm 213 projects radially away from the main shaft component 201, or in a direction towards the rear of the engine. If the turbine drive arm projects in a direction towards the front of the engine, this can prevent backward axial movement in the event of a shaft break.

The axial movement sensor may be a backing sensor 205. For example, such a backing sensor may be formed of an electrical wire (which may be wrapped with brittle ceramic material) which is placed in the trajectory of the rearward movement of the component or element whose movement is to be detected. Should rearward movement occur, the electrical wire is cut and therefore the connection formed by it is broken. This loss of conductivity or connection signals the activation of the sensor, and therefore indicates that rearward movement has occurred.

Conveniently, the axial movement sensor 205 can register the shaft break as a binary signal, which it then provides to an electronic engine controller (EEC) 217 of the engine. The EEC, in response to receiving the signal, can take appropriate action to mitigate the risk of further damage to the engine. For example it may restrict the fuel to the combustor and/or may reduce the amount of the first air flow A e.g. via adjustment of handling bleed valves. Alternatively, one or more variable stator vanes can be adjusted to reduce the frontal area for air flow A.

The spool 200 also includes two friction decelerators 207. In this example, one decelerator is located between stages of the LP turbine 19, and the other is located adjacent to the static structure 206 to which the axial movement sensor 205 is fitted and axially in line with the LP turbine drive arm 213. Therefore, in the event of a shaft break, respective portions of the LP turbine move axially into contact with the friction decelerators. This can help mitigate the risk of an over-speed event, for example by reducing the runaway acceleration and terminal speed of the turbine (i.e. the speed over which there is substantial risk of mechanical failure of the turbine). The decelerator located between stages of the LP turbine is at a relatively high radius from the engine centre line. In such a position it can advantageously generate a relatively high braking torque on the turbine.

As discussed previously, due to an improved detection time period for shaft break and the optional inclusion of one or more friction decelerators, the terminal speed of the turbine can be reduced. Alternatively, to save weight, a lighter turbine can be adopted for a given terminal speed.

Additionally or alternatively to increasing the friction, the axial movement can cause controlled tangling of the rotors and stators of the turbine. Such tangling can further reduce the terminal speed. Compared to frictional deceleration, tangling has an added benefit in that it causes damage to the turbine blades such that they lose efficiency, reducing the amount of energy remaining in the core of the engine that can be transformed into rotational energy of the turbine.

In FIG. 4, areas 220 are demarked to represent regions of sealing and static structures which allow for free backward movement of the unlocated rear portion of the shaft. For example the region between the fan shaft component 208 and the fan stubshaft 215 is sealed but allows free backward movement such that there is no physical interference between components in this region. Regions 222 represent a loss of performance due to an increase of tip clearance in the turbine 19 on backward movement thereof. This performance loss also helps to reduce the terminal speed. For example, such an increase in tip clearance can be created by configuring the outer surface of the working gas annulus so that it expands radially outwards with rearwards distance through the turbine. Regions 222 can be seen, for example, at the radially outmost points of each rotor stage LPT1, LPT2 . . . LPTn. Finally, regions 224 prevent the air system cavity from becoming semi-sealed in the event of a shaft break.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine, comprising:
a fan; and
an engine core comprising a low pressure turbine and a shaft system connecting the low pressure turbine to the fan;
wherein the shaft system is axially located by a thrust bearing located (i) forward of the low pressure turbine and (ii) adjacent to and behind the fan, and the engine is configured such that, in the event of a shaft break which divides the shaft system into a front portion located by the thrust bearing and a rear portion unlocated by the thrust bearing, the rear portion is free to move axially rearwardly under a gas load;
wherein the engine further comprises an axial movement sensor configured to register a shaft break when it detects the axial movement of the rear portion of the shaft system; and
wherein the shaft system comprises a main shaft component, which extends forward from the low pressure turbine and is connected to the low pressure turbine by way of a low pressure turbine drive arm, and a fan shaft component which joins to a front end of the main shaft component and connects the fan to the shaft system, the main and fan shaft components forming functionally a single shaft, and the thrust bearing axially locating the shaft system at the fan shaft component.

2. The gas turbine engine as claimed in claim 1, wherein the shaft system is supported by one or more non-thrust bearings rearwards of the thrust bearing.

3. The gas turbine engine as claimed in claim 1, wherein the low pressure turbine is a multi-stage turbine, and the low pressure turbine drive arm includes one or more inter-stage drive arms.

4. The gas turbine engine as claimed in claim 1, further comprising a friction decelerator which, in the event of a shaft break, engages with the low pressure turbine to apply frictional braking thereto.

5. The gas turbine engine as claimed in claim 1, wherein the gas turbine engine is configured so that the axial movement of the rear portion of the shaft system produces tangling of rotors and stators of the low pressure turbine.

6. The gas turbine engine as claimed in claim 1, wherein the axial movement sensor is a distance sensor, configured to measure a distance between the rear portion of the shaft system and a static structure of the gas turbine engine.

7. The gas turbine engine as claimed in claim 1, wherein the axial movement sensor is a backing sensor, configured to detect axial movement of the rear portion of the shaft system.

8. The gas turbine engine as claimed in claim 1, further comprising an electronic engine controller, which is configured to restrict a flow of fuel to the gas turbine engine when the axial movement sensor registers a shaft break.

9. The gas turbine engine as claimed in claim 1, wherein the axial movement sensor registers the shaft break as a binary signal.

10. An aircraft, including the gas turbine engine as claimed in claim 1.

11. The gas turbine engine as claimed in claim 1, wherein the shaft system comprises a fan stubshaft that is fastened to a front end of the fan shaft component and that provides a mounting position for the thrust bearing.

* * * * *